United States Patent
Van Phan et al.

(10) Patent No.: US 12,501,484 B2
(45) Date of Patent: Dec. 16, 2025

(54) CHANNEL OCCUPANCY TIME FOR SIDELINK COMMUNICATION IN UNLICENSED BAND

(71) Applicant: Nokia Technologies Oy, Espoo (FI)

(72) Inventors: Vinh Van Phan, Oulu (FI); Ling Yu, Kauniainen (FI); Zexian Li, Espoo (FI); Tao Tao, Shanghai (CN); Nuno K. Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/028,020

(22) PCT Filed: Sep. 25, 2020

(86) PCT No.: PCT/CN2020/117871
§ 371 (c)(1),
(2) Date: Mar. 23, 2023

(87) PCT Pub. No.: WO2022/061754
PCT Pub. Date: Mar. 31, 2022

(65) Prior Publication Data
US 2023/0345529 A1    Oct. 26, 2023

(51) Int. Cl.
*H04W 74/0808* (2024.01)
*H04W 16/14* (2009.01)
(Continued)

(52) U.S. Cl.
CPC ..... *H04W 74/0808* (2013.01); *H04W 74/002* (2013.01); *H04W 16/14* (2013.01); *H04W 92/18* (2013.01)

(58) Field of Classification Search
CPC ........... H04W 74/0808; H04W 74/002; H04W 16/14; H04W 92/18
See application file for complete search history.

(56) References Cited

U.S. PATENT DOCUMENTS

| 2018/0176955 A1* | 6/2018 | Salem ............... H04W 74/0808 |
| 2019/0230706 A1* | 7/2019 | Li ........................ H04W 88/08 |

(Continued)

FOREIGN PATENT DOCUMENTS

| CN | 107666681 A | 2/2018 |
| CN | 108781149 A | 11/2018 |

(Continued)

OTHER PUBLICATIONS

Office Action received for corresponding Chinese Patent Application No. 202080105595.0, dated May 30, 2024, 9 pages of Office Action and no page of translation available.

(Continued)

*Primary Examiner* — Ivan O Latorre
(74) *Attorney, Agent, or Firm* — Barta Jones, PLLC

(57) ABSTRACT

Embodiments of the present disclosure relate to devices, methods, apparatuses and computer readable storage media of Channel Occupancy Time (COT) for Sidelink (SL) communication in Unlicensed band (U-band). The method includes receiving, at a first device and from a second device, configuration information associated with a COT at least for a SL transmission of the first device on an unlicensed resource pool allocated for the first device, the configuration information at least indicating whether a listen before talk procedure is required to be performed at the first device within the COT before the SL transmission; and performing the SL transmission within the COT based on the configuration information. In this way, the COT sharing mechanism can be used for SL communications in U-band and therefore a sensing procedure for resource selection may not be impacted by the LBT procedure.

7 Claims, 5 Drawing Sheets

(51) Int. Cl.
*H04W 74/00* (2009.01)
*H04W 92/18* (2009.01)

(56) References Cited

U.S. PATENT DOCUMENTS

| | | | | |
|---|---|---|---|---|
| 2019/0313454 | A1* | 10/2019 | Pu | H04W 24/02 |
| 2020/0053571 | A1* | 2/2020 | Tsai | H04W 74/0808 |
| 2020/0196353 | A1* | 6/2020 | Zhang | H04W 4/023 |
| 2020/0351669 | A1* | 11/2020 | Xu | H04W 76/14 |
| 2021/0007149 | A1* | 1/2021 | Li | H04L 27/0006 |
| 2021/0092783 | A1* | 3/2021 | Sun | H04W 74/0875 |
| 2021/0195637 | A1* | 6/2021 | Xue | H04W 74/0808 |
| 2022/0053482 | A1* | 2/2022 | Yang | H04L 41/0803 |
| 2022/0095117 | A1* | 3/2022 | Liu | H04W 16/14 |
| 2022/0167407 | A1* | 5/2022 | Oviedo | H04W 72/0446 |
| 2022/0183064 | A1* | 6/2022 | Talarico | H04W 74/0808 |
| 2023/0132437 | A1* | 5/2023 | Lei | H04L 5/0091 370/329 |
| 2023/0146161 | A1* | 5/2023 | Sun | H04L 27/2607 370/329 |
| 2023/0269769 | A1* | 8/2023 | Ganesan | H04W 74/0808 370/328 |
| 2023/0284207 | A1* | 9/2023 | Van Phan | H04W 72/56 370/252 |
| 2023/0345529 | A1* | 10/2023 | Van Phan | H04W 74/002 |
| 2023/0422299 | A1* | 12/2023 | Kiilerich Pratas | H04W 74/0808 |
| 2024/0306198 | A1* | 9/2024 | Yu | H04W 16/14 |
| 2024/0406983 | A1* | 12/2024 | Kusashima | H04W 24/08 |
| 2025/0056570 | A1* | 2/2025 | Abreu | H04L 1/1854 |

FOREIGN PATENT DOCUMENTS

| | | |
|---|---|---|
| CN | 109417800 A | 3/2019 |
| CN | 110062464 A | 7/2019 |
| CN | 111096030 A | 5/2020 |
| WO | 2019/161154 A1 | 8/2019 |
| WO | 2019/214544 A1 | 11/2019 |
| WO | 2020/168072 A1 | 8/2020 |
| WO | 2020/168320 A1 | 8/2020 |

OTHER PUBLICATIONS

"Discusssion on NR operation in unlicensed spectrum", 3GPP TSG RAN WG1 Meeting #88, R1-1701619, Agenda Item: 8.1.10, ZTE, Feb. 13-17, 2017, pp. 1-8.
"Views on NR for bands in 6-24GHz range", 3GPP TSG RAN Meeting 82, RP-182398, Agenda item: 9.3.5, Qualcomm Incorporated, Dec. 10-13, 2018, 121 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN), Overall description; Stage 2 (Release 16)", 3GPP TS 36.300, V16.1.0, Mar. 2020, pp. 1-386.
"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
"5 GHz RLAN; Harmonised Standard covering the essential requirements of article 3.2 of Directive 2014/53/EU", ETSI EN 301 893, V2.1.1, May 2017, pp. 1-122.
"IEEE 802.11", Wikipedia, Retrieved on May 24, 2024, Webpage available at : https://en.wikipedia.org/wiki/IEEE_802.11, 18 pages.
"3rd Generation Partnership Project; Technical Specification Group Radio Access Network; Physical layer procedures for shared spectrum channel access (Release 16)", 3GPP TS 37.213, V16.1.0, Mar. 2020, pp. 1-25.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
Extended European Search Report received for corresponding European Patent Application No. 20954606.8, dated Apr. 15, 2024, 9 pages.
"Channel access procedures for NR unlicensed", 3GPP TSG RAN WG1 Meeting #98bis, R1-1911097, Agenda item: 7.2.2.2.1, Qualcomm Incorporated, Oct. 14-20, 2019, pp. 1-18.
ZTE et al., "Discussion on NR operation in unlicensed spectrum," 3GPP TSG RAN WG1 Meeting #88, R1-1701619, Athens, Greece, Feb. 13-17, 2017.

* cited by examiner

CHANNEL OCCUPANCY TIME FOR SIDELINK COMMUNICATION IN UNLICENSED BAND

CROSS REFERENCE TO RELATED APPLICATION

This patent application is a U.S. National Stage application of International Patent Application Number PCT/CN2020/117871 filed Sep. 25, 2020, which is hereby incorporated by reference in its entirety.

FIELD

Embodiments of the present disclosure generally relate to the field of telecommunication and in particular to devices, methods, apparatuses and computer readable storage media of Channel Occupancy Time (COT) for Sidelink (SL) communication in Unlicensed band (U-band).

BACKGROUND

SL communications between User Equipments (UEs) over PC5 interface, as specified in 3GPP, are based on the principle of transmitting UE (Tx UE) oriented one-to-many broadcast. This means that in principle there is no need for a connection setup for SL communication between UEs on the radio-access level, regardless of whether SL communication is for unicast, groupcast or broadcast service.

On one hand, the Tx UE may transmit at least Sidelink Control Information (SCI), which is used as a scheduling assignment for a SL data transmission, to a Receiving UE (Rx UE) or a group of Rx UEs or all Rx UEs in proximity of the Tx UE using resources from a preconfigured resource pool. On the other hand, the Rx UE needs to keep monitoring over the preconfigured resource pool to receive SL transmission, at least receiving all SCI instances and determining whether a received SCI and corresponding SL data transmission is meant for Rx UE to receive.

SUMMARY

In general, example embodiments of the present disclosure provide a solution of COT for SL communication in U-band.

In a first aspect, there is provided a first device. The first device comprises at least one processor; and at least one memory including computer program codes; the at least one memory and the computer program codes are configured to, with the at least one processor, cause the first device at least to receive, from a second device, configuration information associated with a COT at least for a SL transmission of the first device on an unlicensed resource pool allocated for the first device, the configuration information at least indicating whether a listen before talk procedure is required to be performed at the first device within the COT before the SL transmission; and perform the SL transmission within the COT based on the configuration information.

In a second aspect, there is provided a second device. The second device comprises at least one processor; and at least one memory including computer program codes; the at least one memory and the computer program codes are configured to, with the at least one processor, cause the second device at least to determine a channel occupancy time at least for a sidelink transmission of a first device on an unlicensed resource pool allocated for the first device; generate configuration information associated with the COT, the configuration information at least indicating whether a listen before talk procedure is required to be performed at the first device within the COT before the SL transmission; and transmit the configuration information to the first device.

In a third aspect, there is provided a method. The method comprises receiving, at a first device and from a second device, configuration information associated with a COT at least for a SL transmission of the first device on an unlicensed resource pool allocated for the first device, the configuration information at least indicating whether a listen before talk procedure is required to be performed at the first device within the COT before the SL transmission; and performing the SL transmission within the COT based on the configuration information.

In a fourth aspect, there is provided a method. The method comprises determining a channel occupancy time at least for a sidelink transmission of a first device on an unlicensed resource pool allocated for the first device; generating configuration information associated with the COT, the configuration information at least indicating whether a listen before talk procedure is required to be performed at the first device within the COT before the SL transmission; and transmitting the configuration information to the first device.

In a fifth aspect, there is provided an apparatus comprising means for receiving, at a first device and from a second device, configuration information associated with a COT at least for a SL transmission of the first device on an unlicensed resource pool allocated for the first device, the configuration information at least indicating whether a listen before talk procedure is required to be performed at the first device within the COT before the SL transmission; and means for performing the SL transmission within the COT based on the configuration information.

In a sixth aspect, there is provided an apparatus comprising means for determining, a channel occupancy time at least for a sidelink transmission of a first device on an unlicensed resource pool allocated for the first device; means for generating configuration information associated with the COT, the configuration information at least indicating whether a listen before talk procedure is required to be performed at the first device within the COT before the SL transmission; and means for transmitting the configuration information to the first device.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
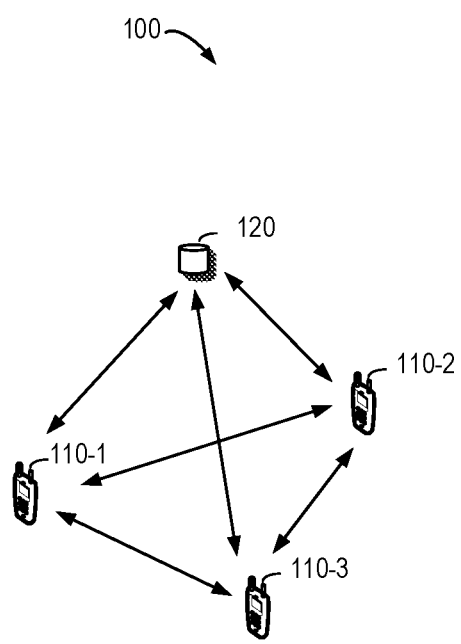
FIG. 1 illustrates an example communication network 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 includes a terminal devices 110-1 (hereinafter may also be referred to as a local UE 110-1 or a first device 110-1). The communication network 100 may comprise a COT provider 120 (hereinafter may also be referred to as a second device 120). The COT provider 120 may be considered as a base station, a Road Side Unit (RSU) or a specific UE. The COT provider 120 may communicate with the terminal devices 110-1.

The communication network 100 may also comprise terminal devices 110-2 and 110-3 (hereinafter may be referred to as other UEs 110-2 and 110-3). The terminal devices 110-1, 110-2 and 110-3 may communicate with each other. The COT provider 120 may also communicate with the terminal devices 110-2 and 110-3. It is to be understood that the number of terminal devices and network devices are only for the purpose of illustration without suggesting any limitations. The communication network 100 may include any suitable number of terminal devices adapted for implementing embodiments of the present disclosure.

The communication network 100 can be implemented in a scenario of SL communication. In SL communication, the communication between terminal devices (for example, V2V, V2P, V2I communications) can be performed via sidelinks. For SL communication, information may be transmitted from a Transmit (TX) terminal device to one or more Receive (RX) terminal devices in a broadcast, or groupcast, or unicast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Long Term Evolution-Unlicensed (LTE-U) and New Radio-Unlicensed (NR-U) for cellular access wherein communications between UE and serving Base station (BS) over Uu interface in unlicensed spectrum (U-spectrum) or U-band have been studied and standardized in 3rd Generation Partnership Project (3GPP). However, SL communications between UEs over PC5 interface in U-band have not been studied in 3GPP so far but anticipated for Industrial Internet of Things (IIoT) supports for examples.

As mentioned above, the Tx UE may transmit at least SCI, which is used as a scheduling assignment for a SL data transmission, to a Rx UE or a group of Rx UEs or all Rx UEs in proximity of the Tx UE using resources from a preconfigured resource pool. The Rx UE needs to keep monitoring over the preconfigured resource pool to receive SL transmission, at least receiving all SCI instances and determining whether a received SCI and corresponding SL data transmission is meant for Rx UE to receive.

There are two modes of resource allocation specified for a SL transmission, namely Mode 1 and Mode 2. In Mode 1, the Tx UE may use resources scheduled or granted from a serving BS. This implies that Tx UE may need to be in RRC CONNECTED state of the serving BS in order to get Mode 1 allocated resources. In Mode 2, the Tx UE may autonomously allocate or select resources from a preconfigured Tx resource pool. The resource selection in Mode 2 can be performed based on a random selection or sensing-based selection. The Mode 2 can be used for Tx UE being in coverage (IC) or out-of-coverage (OoC); in RRC IDLE, RRC INACTIVE or RRC CONNECTED state.

In sub-7 GHz unlicensed bands (U-bands), the NR coexistence with other systems is ensured via a Listen Before Talking (LBT) channel access mechanism. Therefore, a UE intending to perform a SL transmission in a U-band needs first to successfully complete an LBT check before SL transmission is initiated.

To passing an LBT check, it should be determined if the channel is available for a number of consecutive Clear Channel Assessment (CCA) slots. In sub-7 GHz U-band, the duration of these slots is 9 p s. The UE may determine that the channel is available in a CCA slot if the measured power (i.e. the collected energy during the CCA slot) is below a specified threshold.

In unlicensed spectrum there are two types of shared channel access mechanisms, namely a Load Based Equipment (LBE) and a Frame Based Equipment (FBE). For LBE, when a UE initiates the communication, the UE may acquire the "right" to access the channel for a certain time period of, which may be referred to as the Channel Occupancy Time (COT), by applying an "extended" LBT procedure in which the channel can be considered as free on the entire duration of a Contention Window (CW). This "extended" LBT procedure is commonly known as LBT Category 4 (LBT Cat.4) or LBT Type 1. The duration of both the COT and CW depends on the Channel Access Priority Class (CAPC) associated with the UE's traffic shown as below.

TABLE 1

Channel Access Priority Class (CAPC) for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3,4, $T_{ulm\ cot,p}$ = 10 ms if the higher layer parameter absenceOfAnyOtherTechnology-r14 or absence OfAnyOtherTechnology-r16 is provided, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

If the LBT Type 1 (LBT Cat.4) is successfully complete, the UE may perform a transmission and acquire the COT with duration associated with the corresponding CAPC. The acquired COT may be valid even in a case where the initiating device pauses its transmission. If the initiating device intends to perform a new transmission (within the COT), it is still required to perform a "reduced" LBT procedure. This "reduced" LBT procedure is commonly known as LBT Category 2 (LBT Cat.2) or LBT Category 1 (LBT Cat.1), which may also be referred to as LBT Type 2. The LBT Type 2 may refer to different variants such as LBT Type 2A, LBT Type 2B and LBT Type 2C.

The initiating device may share its acquired COT with its receiving device (the responding device). For this purpose, the initiating device must inform explicitly (i.e. via control signaling) the responding device about the duration of this COT. The responding device may use this information to determine which category/type of LBT should be applied for performing a transmission to the initiating device. In case either the transmission from the responding device falls outside the COT or the responding device intends to perform a transmission to a device other than the initiating device, the responding device may have to acquire a new COT using the LBT Type 1 (LBT Cat.4) with the appropriate CAPC.

In the FBE, the channel access procedure is different from the one of LBE. In FBE, A UUT (unit under test) performs a LBT to acquire the channel for a COT during a clear channel assessment (CCA) interval per a fixed frame period in range of 1 ms to 10 ms. The COT may occupy 95% of the fixed frame period while maintain the idle period for at least 100 us. In case LBT in CCA finds the channel occupied, there is no transmissions on the channel during the next fixed frame period.

For continuous transmissions during the COT in which no LBT procedure is required, the gap between two transmissions should be less than 16 us. In case the gap exceeds 16 us, the transmitting device may continue transmissions in this COT if an additional LBT detects no radio local area network (RLAN) transmissions with a level above a predefined threshold. The additional LBT is performed within the gap and within the observation slot immediately before transmission, which may be counted for within the current COT.

Furthermore, in FBE, the responding devices may be allowed to transmit feedback such as ACK to a received packet within the current COT without performing an additional LBT, while in LBE, the responding device may have to perform a LBT (depending on the timing of the transmission from the initiating device and of feedback from the responding device) before accessing the channel to transmit the feedback.

It is considered that a resource pool in U-band (may be denoted as U-pool) and a resource pool in L-band (may be denoted as L-pool) can be configured to UEs for SL communications by the serving network device.

The use of U-pool for SL communications of UEs in proximity is tied to LBT for CCA to acquire a COT. A COT provider may acquire a COT and share the COT with other devices in proximity to transmit for SL communications within the acquired COT without a need or with a reduced need to perform LBT. The SL communications is in principle a broadcast-based proximity communications on the preconfigured U-pool common to all local UEs and the local UEs in Mode 2 may need to perform sensing on U-pool. A LBT procedure required on U-pool is not desirable, which may impact the sensing procedure. Thus, the above-mentioned COT sharing is applicable for SL communications in a local service area of targeted IIoT systems. However, how the COT provider provides and ensures validity of a shared COT for local UEs to use the preconfigured U-pool efficiently is still a problem.

Therefore, the present disclosure provides solution of COT for SL communication in U-band. In this solution, the local UE may receive COT configuration from the COT provider. The COT configuration may at least indicate whether a listen before talk procedure is required to be performed by the local UE within the COT before the SL transmission of the local UE. Then the local UE may perform the SL transmission based on the COT configuration within the duration of the COT.

Principles and implementations of the present disclosure will be described in detail as below with reference to FIG. 2, which shows a schematic process of COT for SL communication in U-band. For the purpose of discussion, the process 200 will be described with reference to FIG. 1. The process 200 may involve the local UE 110-1 and the COT provider 120 as illustrated in FIG. 1.

Figure 2:
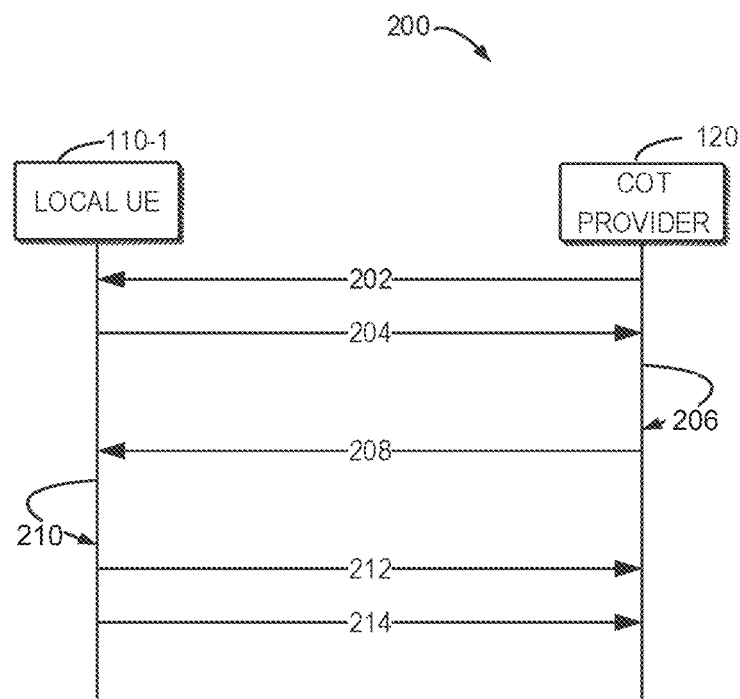
FIG. 2 shows a signaling chart illustrating a process of COT for SL communication in U-band according to some example embodiments of the present disclosure.

As shown in FIG. 2, in a case where the COT provider 120 can be considered as a serving base station, the COT provider 120 may first transmit, to the local UE 110-1, an indication of resource allocation of U-pool and associated L-pool and measurement configuration for reporting a Channel Busy Ratio (CBR), etc. Furthermore, the COT provider 120 may also transmit 202, to the local UE 110-1, configuration information for monitoring the signal indicating a COT configuration, detecting a gap within the COT or transmitting a further signal occupying the COT.

As another option, in a case where the COT provider 120 can be considered as a further local UE, such as the UE 110-2 or 110-3 as shown in FIG. 1, both COT provider 120 and the local UE 110-1 may receive the configuration information for monitoring the signal indicating a COT configuration, detecting a gap within the COT or transmitting a further signal occupying the COT, from a serving base station.

In some example embodiments, the local UEs may be configured to monitor the signal indicating the COT configuration on the preconfigured occasions and/or resources (e.g. time/frequency/code/spatial domain), and determine whether the U-pool is to be used for SL transmission if the signal indicating the COT configuration is received. In some example embodiments, the local UEs may also be configured either to keep or skip monitoring U-pool for SL reception when the signal indicating the COT configuration is not received.

After receiving the above-mentioned configuration information and indication, the local UE 110-1 may perform, for example, a measurement of CBR based on the received information and transmit 204 the measurement report to the COT provider 120.

Then the COT provider 120 may acquire a COT for SL transmission, for example, by performing a LBT procedure. If the LBT procedure is successfully performed then the COT is acquired by the COT provider 120.

In some example embodiments, for example, in a semi-static option (FBE), the fixed frame period and/or fixed COT duration may be preconfigured to the COT provider and the local UEs along with configurations related to the U-pool, and/or SL synchronization for U-pool, and/or time period and resources for transmitting the signal indicating the COT configuration. For example, the fixed frame period of 10 ms and the fixed COT duration of 10 ms minus a predefined OFFSET (covering the idle period including CCA period) may be preconfigured to the COT provider and the local UEs. In another example, the fixed frame period and the fixed COT duration may be derived from the received configuration of U-pool.

In some example embodiments, for example, in a dynamic option (LBE), the COT provider may determine the COT duration upon acquiring a COT for U-pool based on measured load or a measurement report of CBR of local SL communications on the configured U-pool and/or an associated L-pool. The associated L-pool can be preconfigured to the COT provider and local UEs in parallel with U-pool, as the use of U-pool is opportunistic, which may depend on whether a COT is acquired on the U-band or not.

After the COT is acquired, the COT provider 120 may determine 206 the COT configuration for the acquired COT. The COT configuration may indicate a suitable COT on U-band for the possible SL communications towards and between local UEs including the local UE 110-1 using the configured U-pool. For example, the COT configuration may indicate the duration of the COT. Furthermore, the COT configuration may also indicate whether the local UE 110-1 is required to perform an additional LBT procedure for CCA within the acquired COT immediately before the SL transmissions or not.

After determining the COT configuration, the COT provider 120 may transmit 208 the COT configuration via, for example, a first signal to the local UE 110-1.

It is to be understood that the COT provider 120 may also transmit the COT configuration to other UEs for their SL transmission, for example, the UEs 110-2 and 110-3 as shown in FIG. 1.

In some example embodiments, the first signal indicating the COT configuration can be transmitted periodically per a configured time interval within the acquired COT using preconfigured resources in U-band or in L-band or in both U-band and L-band. The transmission of the first signal per the configured time interval may be adapted depending on the duration of the COT.

In some example embodiments, the COT configuration may also indicate a remaining duration of the COT. For example, if the first signal is transmitted after the COT is initiated, the remaining duration may be a time interval between the time point at which the first signal is transmit and the end of the duration of the COT.

In some example embodiments, the first signal may be a Layer 1 (L1) signal or message or a higher-layer message transmitted over PC5 or Uu interface.

After receiving the first signal indicating the COT configuration, the local UE 110-1 may determine 210 whether a LBT procedure is required to be performed within the channel occupancy time before the sidelink transmission of the local UE 110-1.

If the COT configuration indicates a LBT procedure is required to be performed within the channel occupancy time before the sidelink transmission of the local UE 110-1, the local UE 110-1 may determine whether a time interval is detected before the SL transmission within the COT, within which no SL transmission or other signal such as the first signal is scheduled on U-pool or U-band. For example, the time interval may be referred to as a gap within the COT. The gap may comprise a preconfigured duration, for example, a gap larger than 16 µs. The detection of the gap before the SL transmission may be performed by the local UE 110-1 based on the Sidelink Control Information (SCI) or other signal received from other local UEs or the COT provider on U-pool or U-band for examples.

If the local UE 110-1 determines such gap is detected before the SL transmission within the COT, the local UE 110-1 may perform a LBT procedure before the SL transmission within the COT. If the LBT procedure is successfully performed, the local UE 110-1 may perform the SL transmission.

If the local UE 110-1 determines such gap is not detected before the SL transmission within the COT, the local UE 110-1 may perform the SL transmission by skipping the LBT procedure.

If the COT configuration indicates a LBT procedure is not required to be performed within the channel occupancy time before the sidelink transmission of the local UE 110-1, the local UE 110-1 may perform the SL transmission within the COT by skipping the LBT procedure. The local UE 110-1 may further be configured to determine whether a time interval is detected within the COT, within which no SL transmission or other signal such as the first signal is scheduled on U-pool or U-band. For example, the time interval may be referred to as a gap within the COT. The gap may comprise a preconfigured duration, for example, a gap larger than 16 μs. The detection of the gap may be performed based on the Sidelink Control Information (SCI) of the local UE 110-1 and also based on the SCI or other signal received from other local UEs or the COT provider on U-pool or U-band for examples.

As an option, if the local UE 110-1 determines such gap is detected within the COT, the local UE 110-1 may be triggered 212 to transmit a second signal occupying the gap to the COT provider 120.

As another option, if the local UE 110-1 determines such gap is detected within the COT, the local UE 110-1 may transmit 214 an indication of the gap to the COT provider 120. Alternatively, the UE 110-1 may also transmit the indication of the gap to a specific UE. The COT provider 120 or the specific UE may also be configured to detect the gap and transmit the second signal occupying the gap.

In some example embodiments, the detection of the gap may not be required for the local UE 110-1 when the COT configuration indicates a LBT procedure is not required to be performed within the channel occupancy time before the sidelink transmission of the local UE 110-1. In this case, the COT provider 120, or a specific local UE, may be configured to transmit the second signal occupying the COT within the entire duration of the COT. Then the local UE 110-1 may perform the SL transmission within the COT on U-pool by skipping the LBT procedure. The local UE 110-1 may select resources on the frequency domain for the SL transmission, which is different from the resources on the frequency domain used for transmitting the second signal.

In some example embodiments, the second signal may be a preconfigured L1 signal or message or higher-layer message. The second signal may indicate information identical to or different from the first signal.

In some example embodiments, the second signal, in the case of being in form of a preconfigured L1 signal, may be transmitted continuously to fill a detected gap using preconfigured resources on U-band by the COT provider and/or one or more local UEs.

In some example embodiments, the second signal, in the case of being in the form of a preconfigured higher-layer SL message, may be transmitted to fill a detected gap using either preconfigured or on-the-fly allocated resources from U-pool by the COT provider and/or one or more local UEs.

Figure 3A:
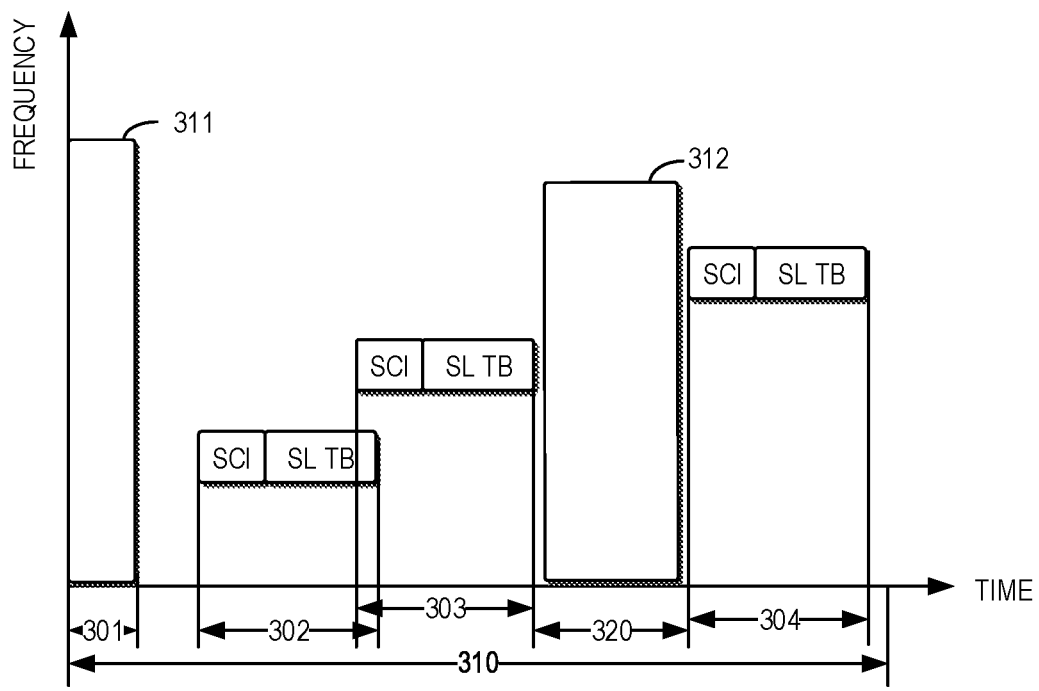
FIGS. 3A and 3B show examples for transmitting the signal for maintaining the COT according to some example embodiments of the present disclosure.
Figure 3B:
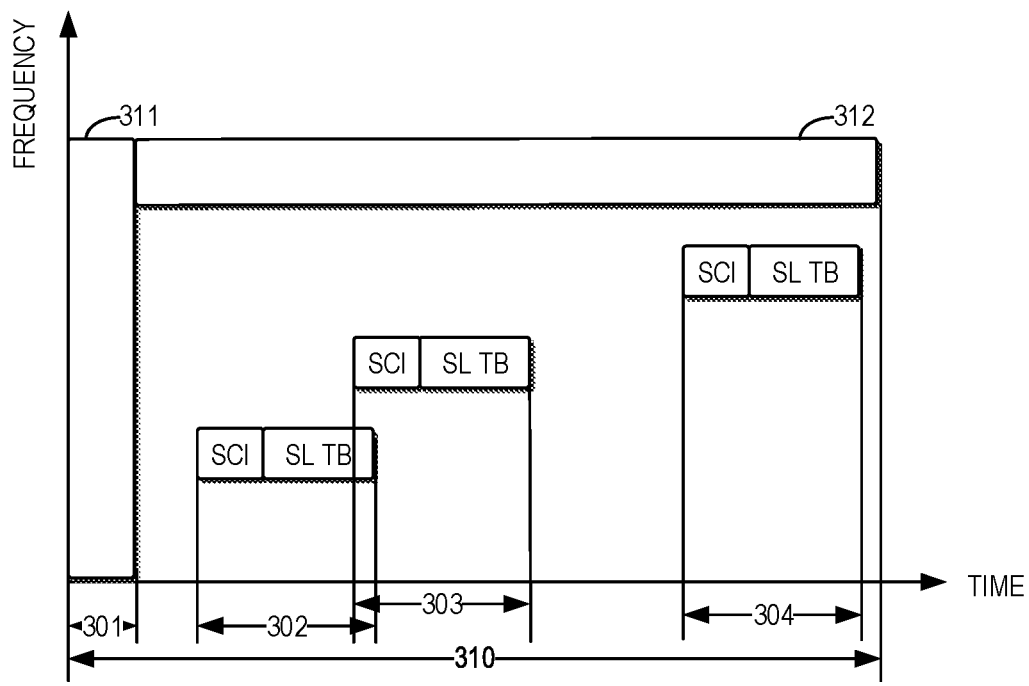

FIGS. 3A and 3B show examples for transmitting the signal for maintaining the COT according to some example embodiments of the present disclosure. As shown in FIG. 3A, in a COT 310, a first signal 311 indicating the COT configuration may be transmitted in a time interval 301. The time intervals 302, 303 and 304 may be occupied by SL transmissions of local UEs. A potential gap 320, for example, larger than 16 s, can be detected. As mentioned above, a second signal 312 occupying the COT can be transmitted during the gap by the COT provider, the local UE 110-1 or other specific UE.

As shown in FIG. 3B, in a COT 310, a first signal 311 indicating the COT configuration may be transmitted in a time interval 301. The time intervals 302, 303 and 304 may be occupied by SL transmissions of local UEs. A second signal 312 occupying the COT can be transmitted on the entire duration of the COT by the COT provider or other specific UE. The second signal could occupy a narrow band with in U-band. In this case, no gap detection is required.

In some example embodiments, considering the possibility that a local UE may be able to receive from more than one COT providers, the local UE may be configured to select one COT provider to follow based on the approach applied for cell selection and reselection when the COT providers are serving BS candidates or for selection and reselection of SL synchronization source when the COT providers are selected UEs. Thus, criteria such as best received signal strength, shortest distance, longest COT, most relevance in terms of grouping relation or belonging user groups, etc., between the local UE and each of the COT providers may be used for selection of the COT provider. It is noted that coordination between the COT providers for providing a consolidated COT in serving an IIoT system over a confined service area as in the targeted use cases may be considered as well.

In this way, the COT sharing mechanism can be used for SL communications in U-band and therefore a sensing procedure for resource selection may not be impacted by the LBT procedure.

Figure 4:
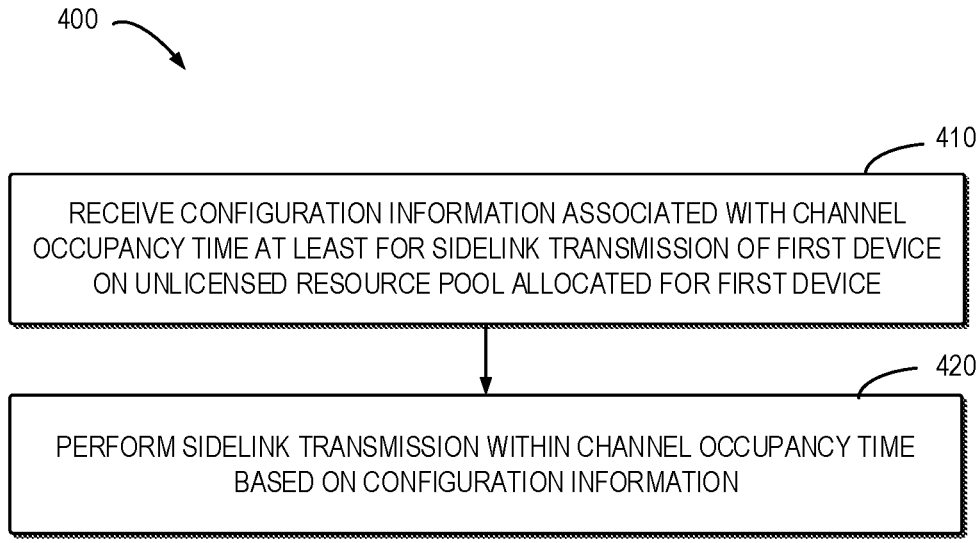
FIG. 4 shows a flowchart of an example method of COT for SL communication in U-band according to some example embodiments of the present disclosure.

FIG. 4 shows a flowchart of an example method 400 of COT sharing for SL communication in U-band according to some example embodiments of the present disclosure. The method 400 can be implemented at the first device 110-1 as shown in FIG. 1. For the purpose of discussion, the method 400 will be described with reference to FIG. 1.

At 410, the first device receives, from a second device, configuration information associated with a channel occupancy time at least for a sidelink transmission of the first device on an unlicensed resource pool allocated for the first device. The configuration information may at least indicate whether a listen before talk procedure is required to be performed at the first device within the channel occupancy time before the sidelink transmission.

In some example embodiments, the first device may receive the configuration information periodically.

In some example embodiments, the configuration information may comprise at least one of the a duration of the channel occupancy time, and a remaining duration of the channel occupancy time, the remaining duration starting from a time point at which the configuration information is received to an end of the channel occupancy time and a remaining duration of the channel occupancy time, the remaining duration starting from a time point at which the sidelink transmission starts to an end of the channel occupancy time.

In some example embodiments, the first device may receive the configuration information via a physical layer signal, a physical layer message, or a higher-layer message.

At 420, the first device performs the sidelink transmission within the channel occupancy time based on the configuration information.

In some example embodiments, if the first device determines based on the configuration information, that the listen before talk procedure is required, the first device may determine, at least based on received sidelink control information, whether a time interval having a duration exceeding a threshold duration is detected within the channel occupancy time before the sidelink transmission of the first device, where neither sidelink transmission nor a signal to be transmitted for indicating or occupying the channel occupancy time being scheduled during the time interval. If the first device determines that the time interval is detected within the channel occupancy time before the sidelink transmission, the first device may determine to perform the listen before talk procedure before the sidelink transmission. If the listen before talk procedure is successful, the first device may perform the sidelink transmission.

In some example embodiments, if the first device determines that the time interval is not detected within the channel occupancy time before the sidelink transmission, the first device may perform the sidelink transmission by skipping the listen before talk procedure.

In some example embodiments, if the first device determines based on the configuration information, that the listen before talk procedure is not required, the first device may perform the sidelink transmission by skipping the listen before talk procedure.

In some example embodiments, if the first device determines based on the configuration information, that the listen before talk procedure is not required, the first device may determine, at least based on received sidelink control information, whether a time interval having a duration exceeding a threshold duration is detected within the channel occupancy time, where neither sidelink transmission nor a signal to be transmitted for indicating or occupying the channel occupancy time being scheduled. If the first device determines that the time interval is detected within the channel occupancy time, the first device may transmit a signal for occupying the channel occupancy time during the time interval.

In some example embodiments, if the first device determines based on the configuration information, that the listen before talk procedure is not required, the first device may determine, at least based on received sidelink control information, whether a time interval having a duration exceeding a threshold duration is detected within the channel occupancy time, where neither sidelink transmission nor a signal to be transmitted for indicating or occupying the channel occupancy time being scheduled. If the first device determines that the time interval is detected within the channel occupancy time, the first device may transmit an indication of the time interval to the second device, to cause the second device to transmit a signal occupying the channel occupancy time during the time interval.

Figure 5:
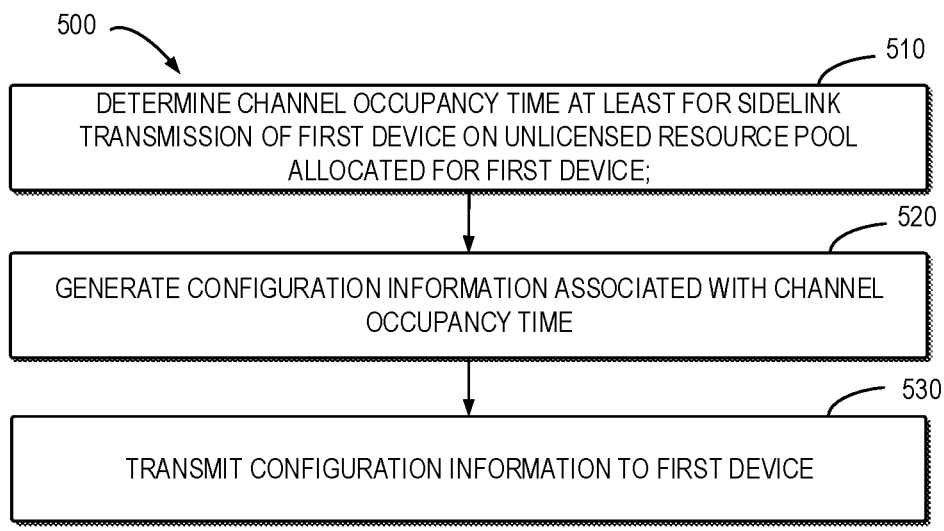
FIG. 5 shows a flowchart of an example method of COT for SL communication in U-band according to some example embodiments of the present disclosure.

FIG. 5 shows a flowchart of an example method 500 of COT sharing for SL communication in U-band according to some example embodiments of the present disclosure. The method 500 can be implemented at the second device 120 or a further local UE 110-2 or 110-3 as shown in FIG. 1. For the purpose of discussion, the method 500 will be described with reference to FIG. 1.

At 510, the second device determines a channel occupancy time at least for a sidelink transmission of a first device on an unlicensed resource pool allocated for the first device.

At 520, the second device generates configuration information associated with the channel occupancy time. The configuration information may at least indicate whether a listen before talk procedure is required to be performed at the first device within the channel occupancy time before the sidelink transmission.

At 530, the second device transmits the configuration information to the first device.

In some example embodiments, the second device may transmit the configuration information periodically.

In some example embodiments, the second device may transmit in the configuration information at least one of a duration of the channel occupancy time, and a remaining duration of the channel occupancy time, the remaining duration starting from a time point at which the configuration information is received to an end of the channel occupancy time, and a remaining duration of the channel occupancy time, the remaining duration starting from a time point at which the sidelink transmission starts to an end of the channel occupancy time.

In some example embodiments, the second device may transmit the configuration information via a physical layer signal or message, or a higher-layer message.

In some example embodiments, if the second device determines the listen before talk procedure is not required to be performed at the first device within the channel occupancy time before the sidelink transmission, the second device may transmit a signal for occupying the channel occupancy time on a duration of the channel occupancy time.

In some example embodiments, the second device may transmit a signal occupying the channel occupancy time during a time interval within the channel occupancy time if the second device receives an indication of the time interval from the first device, where neither sidelink transmission nor a signal to be transmitted for indicating or occupying the channel occupancy time being scheduled during the time interval.

In some example embodiments, if the second device determines the listen before talk procedure is not required to be performed at the first device within the channel occupancy time before the sidelink transmission, the second device may determine whether a time interval having a duration exceeding a threshold duration is detected within the channel occupancy time, where neither sidelink transmission nor a signal to be transmitted for indicating or occupying the channel occupancy time being scheduled during the time interval. If the second device determines the time interval is detected, the second device may transmit signal occupying the channel occupancy time during the time interval.

In some example embodiments, an apparatus capable of performing the method 400 (for example, implemented at the first device 110-1) may comprise means for performing the respective steps of the method 400. The means may be implemented in any suitable form. For example, the means may be implemented in a circuitry or software module.

In some example embodiments, the apparatus comprises means for receiving, at a first device and from a second device, configuration information associated with a COT at least for a SL transmission of the first device on an unlicensed resource pool allocated for the first device, the configuration information at least indicating whether a listen before talk procedure is required to be performed at the first device within the COT before the SL transmission; and means for performing the SL transmission within the COT based on the configuration information.

In some example embodiments, an apparatus capable of performing the method 500 (for example, implemented at the second device 120) may comprise means for performing the respective steps of the method 500. The means may be implemented in any suitable form. For example, the means may be implemented in a circuitry or software module.

In some example embodiments, the apparatus comprises means for determining, a channel occupancy time at least for a sidelink transmission of a first device on an unlicensed resource pool allocated for the first device; means for generating configuration information associated with the COT, the configuration information at least indicating whether a listen before talk procedure is required to be performed at the first device within the COT before the SL transmission; and means for transmitting the configuration information to the first device.

Figure 6:
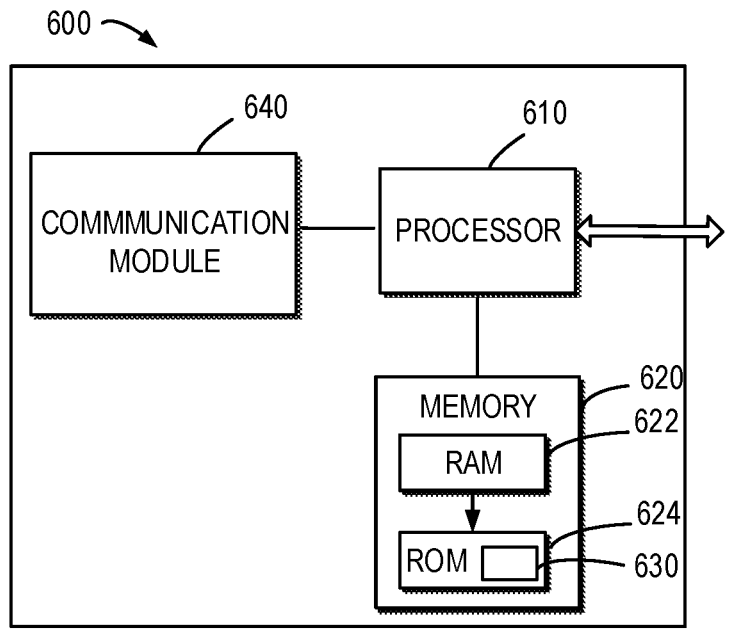
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the UE 110-1 or the COT provider 120 as shown in FIG. 1. As shown, the device 600 includes one or more processors 610, one or more memories 620 coupled to the processor 610, and one or more transmitters and receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2-5. The embodiments of the present disclosure may also be implemented by hardware or by a combination of software and hardware.

Figure 7:
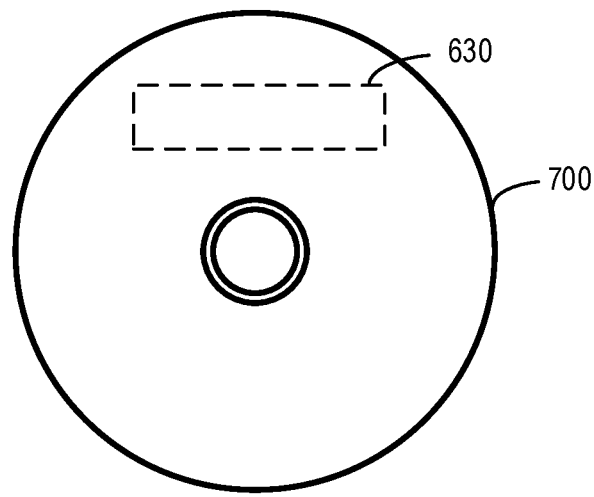
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400 and 500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one non-transitory memory storing instructions that, when executed by the at least one processor, cause the first device at least to:
receive, from a second device via a Layer 1 signal using preconfigured resource in an unlicensed band, configuration information associated with a channel occupancy time at least for a sidelink transmission of the first device on an unlicensed resource pool allocated for the first device, the configuration information at least indicating whether a listen before talk procedure is required within the channel occupancy time before the sidelink transmission, wherein the configuration information comprises:
a duration of the channel occupancy time,
a first remaining duration of the channel occupancy time, the first remaining duration starting from a time point at which the configuration information is received to an end of the channel occupancy time, and
a second remaining duration of the channel occupancy time, the second remaining duration starting from a time point at which the sidelink transmission starts to the end of the channel occupancy time; and
based on the configuration information, perform the sidelink transmission within the channel occupancy time before the sidelink transmission by:
in response to a determination, based on the configuration information, that the listen before talk procedure is required, determining, at least based on a sidelink control information, whether a time interval having a duration exceeding a threshold duration of 16 µs is detected within the channel occupancy time before the sidelink transmission of the first device, wherein neither the sidelink transmission nor a signal indicating or occupying the channel occupancy time is scheduled during the time interval;
based on determining that the time interval is detected within the channel occupancy time before the sidelink transmission, performing the listen before talk procedure before the sidelink transmission and within the channel occupancy time; and
based on determining that the listen before talk procedure is successful, performing the sidelink transmission on frequency-domain resources of the unlicensed resource pool that are different from frequency-domain resources used for transmitting the configuration information.

2. A second device, comprising:
at least one processor; and
at least one non-transitory memory storing instructions that, when executed by the at least one processor, cause the second device at least to:
determine a channel occupancy time at least for a sidelink transmission of a first device on an unlicensed resource pool allocated for the first device;
generate configuration information associated with the channel occupancy time, the configuration information at least indicating whether a listen before talk procedure is required to be performed at the first device within the channel occupancy time before the sidelink transmission, wherein the configuration information comprises:
a duration of the channel occupancy time,
a first remaining duration of the channel occupancy time, the first remaining duration starting from a time point at which the configuration information is received to an end of the channel occupancy time, and
a second remaining duration of the channel occupancy time, the second remaining duration starting from a time point at which the sidelink transmission starts to the end of the channel occupancy time;
transmit the configuration information to the first device; and
based on receiving an indication of a time interval from the first device, transmit a signal occupying the channel occupancy time during the time interval having a duration exceeding a threshold duration of 16 µs within the channel occupancy time, wherein neither a sidelink transmission nor a signal to be transmitted for indicating or occupying the channel occupancy time is scheduled during the time interval.

3. The second device of claim 2, wherein the instructions, when executed by the at least one processor, cause the second device to transmit the configuration information by:
transmitting the configuration information based on at least one of:
a physical layer message,
a physical layer signal, and
a higher-layer message.

4. The second device of claim 3, wherein the instructions, when executed by the at least one processor, cause the second device to:
in response to a determination that the listen before talk procedure is not required to be performed at the first device within the channel occupancy time before the sidelink transmission, transmit a signal for occupying the channel occupancy time on a duration of the channel occupancy time.

5. The second device of claim 4, wherein the instructions, when executed by the at least one processor, cause the second device to:
in response to a determination that the listen before talk procedure is not required to be performed at the first device within the channel occupancy time before the sidelink transmission, determine whether a time interval having a duration exceeding a threshold duration is detected within the channel occupancy time, where neither sidelink transmission nor a signal to be transmitted for indicating or occupying the channel occupancy time is scheduled during the time interval; and
based on determining that the time interval is detected, transmit a signal occupying the channel occupancy time during the time interval.

6. A method, comprising:
receiving, at a first device and from a second device, configuration information associated with a channel occupancy time at least for a sidelink transmission of the first device on an unlicensed resource pool allocated for the first device, the configuration information at least indicating whether a listen before talk procedure is required to be performed at the first device within the channel occupancy time before the sidelink transmission, wherein the configuration information comprises:
a duration of the channel occupancy time,
a first remaining duration of the channel occupancy time, the first remaining duration starting from a time point at which the configuration information is received to an end of the channel occupancy time, and
a second remaining duration of the channel occupancy time, the second remaining duration starting from a time point at which the sidelink transmission starts to the end of the channel occupancy time; and
based on the configuration information, performing the sidelink transmission within the channel occupancy time, by:
in response to a determination, based on the configuration information, that the listen before talk procedure is required, determining, at least based on a sidelink control information, whether a time interval having a duration exceeding a threshold duration of 16 µs is detected within the channel occupancy time before the sidelink transmission of the first device, wherein neither the sidelink transmission nor a signal indicating or occupying the channel occupancy time is scheduled during the time interval:
based on determining that the time interval is detected within the channel occupancy time before the sidelink transmission, performing the listen before talk procedure before the sidelink transmission and within the channel occupancy time; and
based on determining that the listen before talk procedure is successful, performing the sidelink transmission on frequency-domain resources of the unlicensed resource pool that are different from frequency-domain resources used for transmitting the configuration information.

7. A non-transitory program storage device readable with an apparatus, tangibly embodying a program of instructions executable with the apparatus for performing the method of claim 6.

* * * * *